United States Patent [19]

Boubelik

[11] Patent Number: 5,365,570

[45] Date of Patent: Nov. 15, 1994

[54] EMERGENCY CELLULAR TELEPHONE APPARATUS

[76] Inventor: Mark J. Boubelik, 2819 Edison Ave., Sacramento, Calif. 95821

[21] Appl. No.: 892,328

[22] Filed: Jun. 2, 1992

[51] Int. Cl.$^5$ .................... H04M 11/00; H04M 1/00; H04M 9/00

[52] U.S. Cl. ..................... 379/59; 379/369; 379/370; 379/433

[58] Field of Search ............ 379/38, 39, 59, 433, 379/447, 368, 369, 370; 455/89, 90

[56] References Cited

U.S. PATENT DOCUMENTS

| | | | |
|---|---|---|---|
| 3,838,229 | 9/1974 | Morrell et al. | 179/100 |
| 4,724,538 | 2/1988 | Farrell | 379/59 |
| 4,777,469 | 10/1988 | Engelke et al. | 379/96 |
| 4,777,646 | 10/1988 | Harris | 379/59 |
| 4,788,711 | 11/1988 | Nasco, Jr. | 379/59 |
| 4,831,647 | 5/1989 | D'Avello et al. | 379/59 |
| 4,866,764 | 9/1989 | Barker, III | 379/368 |
| 4,893,331 | 1/1990 | Horinchi et al. | 379/93 |
| 5,016,269 | 5/1991 | Rogers | 379/59 |
| 5,142,573 | 8/1992 | Umezawa | 455/89 |
| 5,148,471 | 9/1992 | Metroka et al. | 379/58 |

*Primary Examiner*—Stephen Chin
*Assistant Examiner*—Vijay Shankar

[57] ABSTRACT

Emergency radio telephone apparatus includes a housing, a radio transceiver for receiving and transmitting modulated radio signals, an actuator connected to the housing for actuating the transceiver and initiating the process of making connection to a predetermined emergency phone number. The actuator may alternately be of modular construct, not permanently connected to the housing allowing easy replacement of the emergency call actuator with a modular construction telephone keypad and display, thereby converting the emergency-only radio telephone into a full-functioned radio telephone. A cover can be attached to the transceiver allowing access only to the emergency call actuator thereby restricting calls to only the emergency number. Cover, modular keypad, modular actuator, or transceiver can have a lock to prevent removal of modular components.

10 Claims, 3 Drawing Sheets

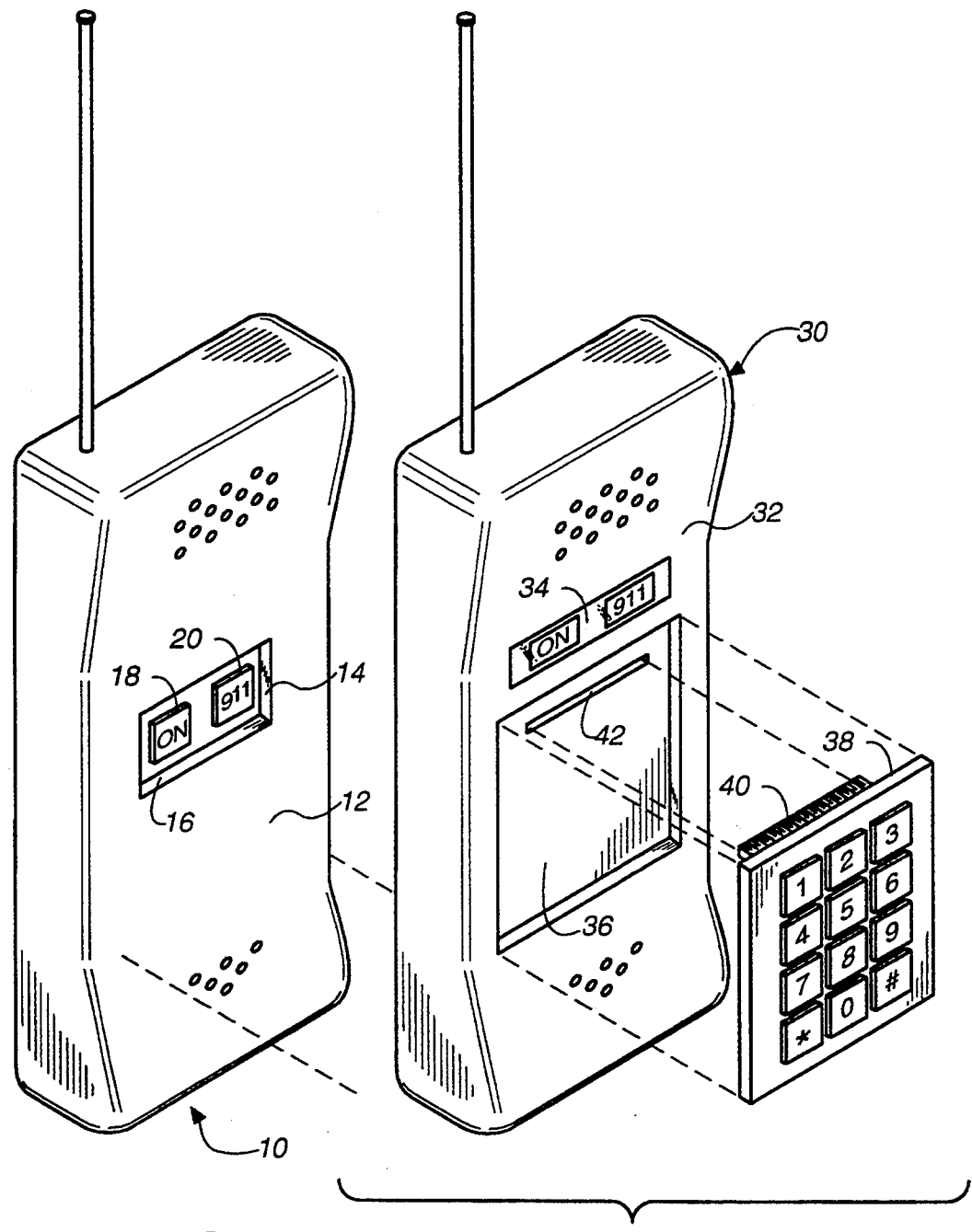
FIG._1  FIG._1A

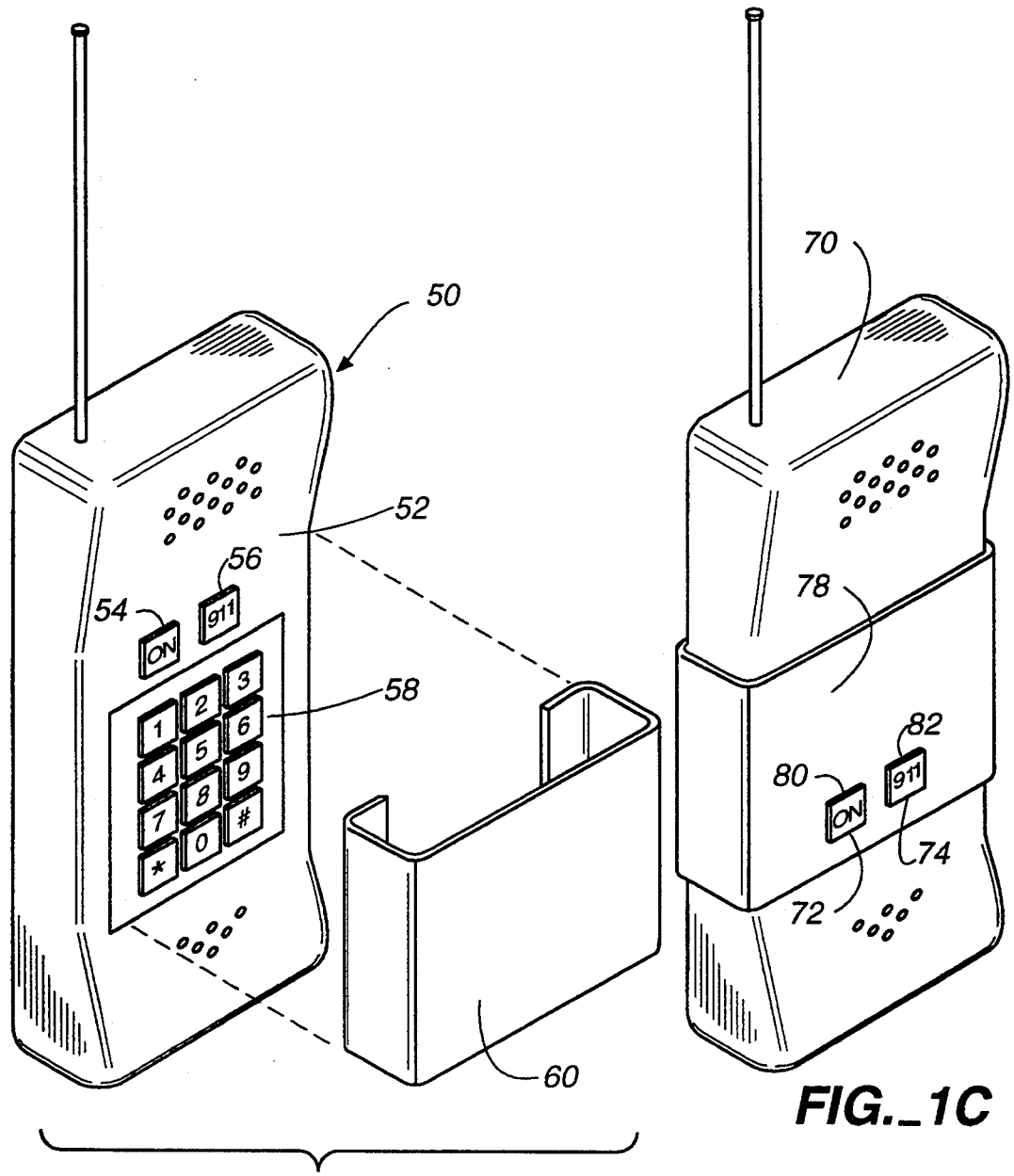
FIG._1B
FIG._1C

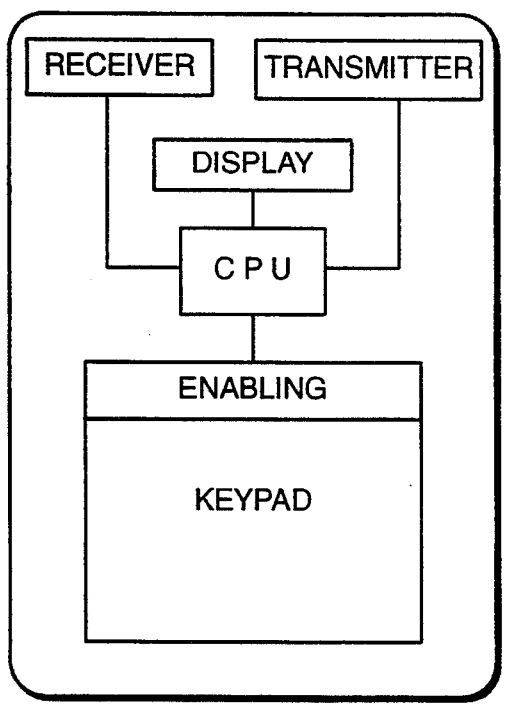
FIG._2
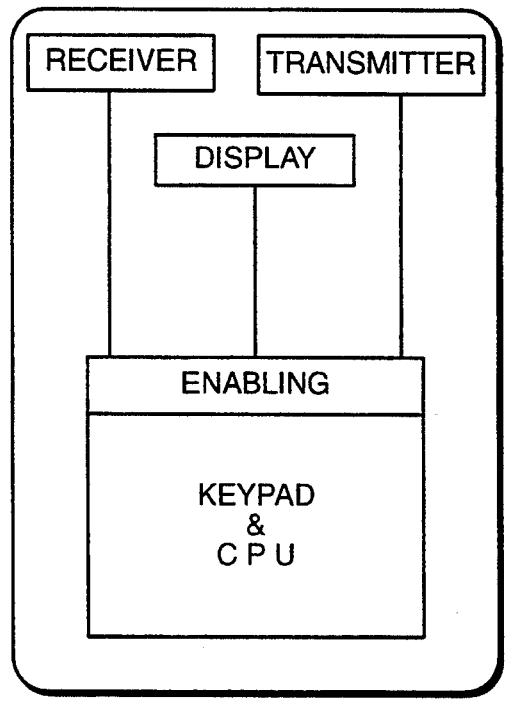
FIG._3
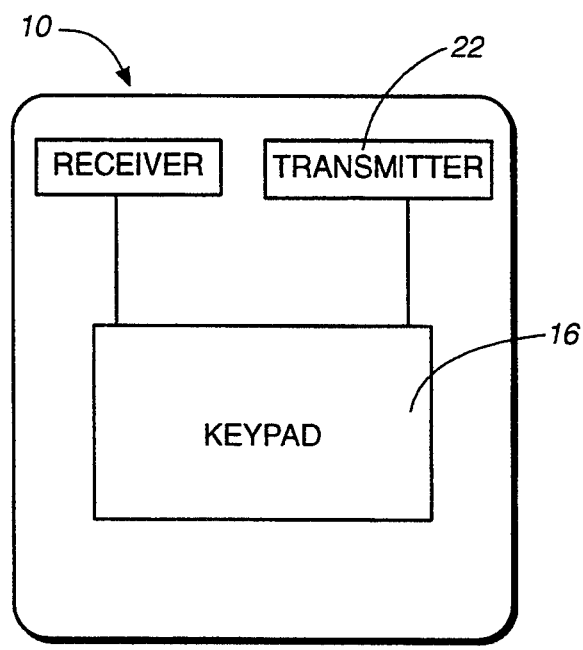
FIG._4

EMERGENCY CELLULAR TELEPHONE APPARATUS

TECHNICAL FIELD

This invention relates to telephone apparatus and, more particularly, to cellular phone apparatus incorporating transmitter means, actuator means, and means for restricting the electrical signal transmitted by the transmitter means to a predetermined emergency calling number upon actuation of the actuator means by a user.

BACKGROUND ART

Cellular telephone constructions are well known in the art. Such devices are commonly employed to make and receive calls through a cellular telecommunication system. With such a system, the caller can be placed into contact with virtually any telephone, both domestic and foreign through a cellular network and conventional phone networks.

It is an object of the present invention to provide a cellular phone construction which is or can be dedicated to emergency use only. That is, the phone apparatus is of such construction as to restrict use thereof to transmit an electrical signal to a predetermined emergency calling number. One commonly employed calling number in the United States, for example, is the well known 911 number.

Utilizing the teachings of the present invention, costs of both manufacture and use may be lessened considerably. While a conventional cellular phone may, of course, be utilized to dial 911 in a conventional manner, a person wishing to utilize this service must do so employing a full service cellular phone and by paying the full service monthly and use charges associated therewith.

A search directed to the present invention located the following U.S. Pat. Nos.: 4,893,331, issued Jan. 9, 1990, 4,788,711, issued Nov. 29, 1988, 4,724,538, issued Feb. 9, 1988, 4,777,469, issued Oct. 11, 1988, 5,016,269, issued May 14, 1991, and 3,838,229, issued Sep. 24, 1974.

While some of the above-identified patents disclose arrangements for initiating emergency calls from a cellular telephone (see, for example, U.S. Pat. No. 5,016,269), there is no teaching of a cellular telephone construction which is or can be dedicated to such purpose. U.S. Pat. No. 4,788,711 shows a self-contained cellular emergency roadside call box but the teachings of this invention are not applicable to personal use by an individual wherever he or she might be located.

DISCLOSURE OF INVENTION

The present invention relates to an emergency cellular phone apparatus which includes a cellular phone housing. Transmitter means is provided for transmitting an electrical signal.

Actuator means is connected to the housing and manually accessible from a location external of the housing for actuating the transmitter means.

Means is in operative association with the transmitter means and with the actuator means for restricting the electrical signal to a predetermined emergency calling number upon actuation of the actuator means by a user of the emergency cellular phone apparatus.

A number of embodiments of the invention are disclosed herein which allow the user to greatly lower the cost of use thereof as compared to employing conventional cellular phone constructions to make emergency calls in a conventional fashion. Furthermore, restricting use of the cellular telephone apparatus as disclosed herein allows the user to either avoid or defer some of the costs involved as compared to purchasing or leasing a full service cellular phone.

Other features, advantages, and objects of the present invention will become apparent with reference to the following description and accompanying drawings.

BRIEF DESCRIPTION OF DRAWINGS

FIG. 1 is a frontal perspective view of one form of emergency cellular phone apparatus constructed in accordance with the teachings of the present invention;

FIG. 1A is a frontal, exploded, perspective view of a second form of apparatus constructed in accordance with the teachings of the present invention which incorporates a modular keypad, said keypad being shown in the position assumed thereby before being assembled with the phone housing;

FIG. 1B is a frontal perspective view illustrating a third form of apparatus constructed in accordance with the teachings of the present invention, said apparatus incorporating a removable sleeve, said sleeve being shown prior to assembly;

FIG. 1C is a frontal perspective view of yet another form of apparatus constructed in accordance with the teachings of the present invention which also incorporates a removable sleeve, said sleeve here being shown assembled with the apparatus housing; and FIGS. 2–4 are alternative schematic diagrams which may be employed when practicing the teachings of the present invention.

MODES FOR CARRYING OUT THE INVENTION

FIG. 1 illustrates a phone 10 constructed in accordance with the teachings of the present invention. Phone 10 includes a housing 12 defining an aperture 14 in the front panel thereof.

The simplified schematic diagram for phone 10 is shown in FIG. 4. The phone incorporates a simplified, permanently installed keypad 16 which has only two function buttons, a push button 18 to turn the phone on and a second push button 20 which is depressed by the user to transmit an electrical signal to the emergency calling number 911 through transmitter 22. Phone 10 incorporates a conventional receiver to receive the signal initiated at the 911 station.

It will be appreciated that phone 10 is a dedicated emergency cellular phone apparatus, the user being unable to utilized the phone for other than communication with the 911 station. This means that the phone 10 can be considerably cheaper than a conventional cellular phone since it does not employ all the circuitry or mechanisms required to function as a full service phone.

Furthermore, cost of operation of the cellular phone will be considerably less than operation of full service cellular phones. Not only is the user restricted from making calls to other than the 911 number, it is anticipated that telephone operating companies and networks will make available special lower rates to owners and users of dedicated cellular phones of the types disclosed herein. This approach provides business to such business entities which would not otherwise be available since not everyone wishes to invest in a full service cellular phone or pay the operating rates associated therewith.

FIG. 1A shows an alternative form of phone 30 having a housing 32. In this arrangement, the housing 32 accommodates a flexible strip 34 imprinted with the indicia "ON" and "911". Depression of the strip 34 at the indicia will actuate suitable conventional switches (not shown) which will initiate the indicated functions, much in the manner as the push buttons 18, 20 of the FIG. 1 embodiment.

Phone 30, however, differs from phone 10 in that phone 30 may be selectively modified to change from a dedicated emergency calling apparatus to one which has a full service function.

Phone 30 has a recess 36 which accommodates a keypad 38 incorporating the conventional circuitry and mechanisms required to initiate cellular telephone calls to any desired number through the transmitter associated with phone 30. Interconnection with the circuitry within housing 32 is made via a pin connector 40 on the keypad received in socket 42 of phone 30.

Phone 30 without the keypad 38 would have a simplified circuit diagram of the general type shown in FIG. 4. The phone 30 with keypad 38 assembled and in position on the housing can have either the circuit diagram of FIG. 2 or FIG. 3. In FIG. 2, the central processing unit controlling the operation of the phone 30 is disposed within the housing 32 and the keypad simply operates as a keypad. Alternatively, the keypad itself may incorporate the central processing unit controlling operation of the phone as shown in FIG. 3.

It is apparent that with the arrangement of FIG. 3, the user may defer a greater percentage of the equipment expense before converting the phone to full function capability. In both circuit diagrams 2 and 3, the keypad and CPU are shown as operatively associated with a suitable enabling circuit which is programmed or activated to send an access code to the cellular system in the conventional manner so that the phone can be used in either the dedicated emergency use mode or full service mode. A suitable display may be incorporated in the phone to provide the user with appropriate information, as is conventional.

FIG. 1B illustrates a phone 50 having a housing 52 from which project "ON" push button 54 and "911" push button 56. Additionally, phone 50 incorporates a full service keypad 58 which is permanently installed relative to the housing and operatively associated with conventional circuitry and mechanisms incorporated in conventional cellular phones. When the operator wishes to use the phone as a dedicated emergency telephone, keypad 58 is covered by a sleeve 60 which slips or is snapped about the housing 52 and covers keypad 58, leaving push buttons 54, 56 exposed. Suitable lock means (not shown) may be employed to ensure that the sleeve remains in position and the phone not used for other than emergency calling.

FIG. 1C shows an arrangement similar to FIG. 1B except that phone 70 employs a keypad which incorporates all of the buttons shown in FIG. 1B as well as the "ON" push button 72 and the "911" push button 74. A sleeve 78 is positioned over the housing of phone 70 when dedicated emergency use is desired. Sleeve 78 incorporates apertures 80, 82 through which buttons 72, 74 project, the remaining buttons of the keypad being covered.

What is claimed is:

1. Emergency cellular phone apparatus including, in combination:
   a cellular phone housing;
   radio frequency transceiver means for transmitting and receiving modulated radio signals;
   audio processing means for voice and signaling modulation and demodulation of said radio signals;
   central processing means for controlling call setup activities on the cellular network;
   power supply means for delivering necessary voltages and currents to said radio frequency transceiver means and said audio processing means and said central processing means;
   actuator means manually accessible from a location external to said cellular phone housing for actuating said radio frequency transceiver means and said audio processing means and said central processing means and said power supply means;
   said actuator being modular includes electrical connector means and is selectively connectable to and disconnectable from said cellular phone housing;
   said cellular phone housing defining a recess for accommodating said actuator means;
   said cellular phone housing includes a socket communicating with said recess for receiving said electrical connector means when said actuator means is accommodated by said recess;
   call restriction means in operative association with said central processing means for restricting modulation of said radio signals, during call initiation by operation of said actuator means, to signals required for connection to a predetermined emergency phone number;
   incoming call answering means in operative association with said central processing means for establishing audio communications upon actuation of said actuator means by a user of said emergency cellular phone apparatus when an incoming call occurs.

2. The emergency cellular phone apparatus according to claim 1 wherein said actuator means, upon actuation of said actuator means by a user of said emergency cellular phone apparatus, communicating with said power supply means to connect said necessary voltages and currents to said radio frequency transceiver means and said audio processing means and said central processing means, then communicating with said central processing means thereby initiating a call to said predetermined emergency phone number.

3. The emergency cellular phone apparatus according to claim 1 including a power control means in communication with said power supply means to selectively connect and disconnect said necessary voltages and currents to said radio frequency transceiver means and said audio processing means and said central processing means regardless of status of said actuator means;
   said actuator means, upon actuation of said actuator means by a user of said emergency cellular phone apparatus while no connection is established to said predetermined emergency phone number, communicating with said central processing means thereby initiating a call to said predetermined emergency phone number provided that said necessary voltages and currents are connected to said radio frequency transceiver means and said audio processing means and said central processing means.

4. The emergency cellular phone apparatus according to claim 1 additionally including a dual-tone-multi-frequency keypad means substantially the same size and shape of said actuator means, incorporating a plurality of push buttons cooperable with said central processing means and said audio processing means for enabling a user of said emergency cellular phone apparatus to initiate a call to said predetermined emergency phone number by pressing any of said push buttons, then transmit dual-tone-multi-frequency signals after connection to said predetermined emergency phone number is established;

said dual-tone-multi-frequency keypad includes said electrical connector means for communicating with said central processing means via said socket;

said dual-tone-multi-frequency keypad is modular and selectively connectable to and disconnectable from said cellular phone housing whereby said emergency cellular phone apparatus may be modified to selectively include said dual-tone-multi-frequency keypad means or said actuator means.

5. The emergency cellular phone apparatus according to claim 1 additionally including a cellular keypad means substantially the same size and shape of said actuator means, incorporating a plurality of push buttons cooperable with said central processing means;

said cellular keypad includes said electrical connector means for communicating with said central processing means via said socket;

said cellular keypad includes a control means in communication with said central processing means for disabling said call restriction means, thereby providing said keypad capability of originating calls to non-emergency phone numbers and receiving calls from a cellular network;

said cellular keypad includes said power control means in communication with said power supply means to selectively connect and disconnect said necessary voltages and currents to said radio frequency transceiver means and said audio processing means and said central processing means;

said cellular keypad is modular and selectively connectable to and disconnectable from said cellular phone housing whereby said emergency cellular phone apparatus may be modified to selectively dedicate said emergency cellular phone apparatus to an emergency use or to a full function cellular phone.

6. The emergency cellular phone apparatus according to claim 5 wherein said cellular keypad includes display means communicating with said central processing means for providing a user of said emergency cellular phone apparatus with information sent to said display means from said central processing means.

7. The emergency cellular phone apparatus according to claim 5 wherein said cellular keypad means includes a locking means for selectively preventing disengagement of said cellular keypad means from said cellular phone housing.

8. The emergency cellular phone apparatus according to claim 4 wherein said dual-tone-multi-frequency keypad means includes a locking means for selectively preventing disengagement of said dual-tone-multi-frequency keypad means from said cellular phone housing.

9. The emergency cellular phone apparatus according to claim 1 wherein said actuator means includes a locking means for selectively preventing disengagement of said actuator means from said cellular phone housing.

10. The emergency cellular phone apparatus according to claim 1 wherein said cellular phone housing includes a locking means for selectively preventing disengagement of said actuator or said dual-tone-multi-frequency keypad or said cellular keypad from said cellular phone housing when said actuator means or said dual-tone-multi-frequency keypad or said cellular keypad is accommodated by said recess.

* * * * *